(12) United States Patent
Xuan et al.

(10) Patent No.: US 11,075,755 B2
(45) Date of Patent: Jul. 27, 2021

(54) ZERO-KNOWLEDGE KEY ESCROW

(71) Applicant: VMware, Inc., Palo Alto, CA (US)

(72) Inventors: Chaoting Xuan, Duluth, GA (US);
Qimin Yao, Dunwoody, GA (US);
Litao Shen, Alpharetta, GA (US)

(73) Assignee: VMWARE, INC., Palo Alto, CA (US)

( * ) Notice: Subject to any disclaimer, the term of this patent is extended or adjusted under 35 U.S.C. 154(b) by 220 days.

(21) Appl. No.: 16/393,033

(22) Filed: Apr. 24, 2019

(65) Prior Publication Data
US 2020/0344054 A1    Oct. 29, 2020

(51) Int. Cl.
| | |
|---|---|
| *G06F 21/00* | (2013.01) |
| *H04L 9/08* | (2006.01) |
| *H04L 9/14* | (2006.01) |
| *H04L 9/32* | (2006.01) |
| *G06F 21/60* | (2013.01) |

(52) U.S. Cl.
CPC .......... *H04L 9/0894* (2013.01); *G06F 21/604* (2013.01); *H04L 9/085* (2013.01); *H04L 9/14* (2013.01); *H04L 9/3218* (2013.01)

(58) Field of Classification Search
CPC ...... G06F 21/60; G06F 21/602; G06F 21/604; G06F 21/62; G06F 21/6218; G06F 21/6245; G06F 21/6272; H04L 9/08; H04L 9/088; H04L 9/0894; H04L 9/0897
See application file for complete search history.

(56) References Cited

U.S. PATENT DOCUMENTS

| | | | |
|---|---|---|---|
| 2016/0021101 A1* | 1/2016 | Balch | H04L 63/061 713/171 |
| 2016/0337124 A1* | 11/2016 | Rozman | H04L 9/085 |

* cited by examiner

*Primary Examiner* — Edward Zee
(74) *Attorney, Agent, or Firm* — Thomas Horstemeyer, LLP (57) ABSTRACT

Disclosed are various embodiments for implementing a key escrow system without disclosure of a client's encryption key to third parties. An encryption key is split into a plurality of key segments pursuant to a shared secret protocol. A plurality of peer client devices are then identified. Each peer client device in the plurality of peer client devices is then verified and the respective one of the plurality of key segments are sent to a respective one of the plurality of peer client devices. A response is then received from each respective one of the plurality of peer client devices, the response confirming receipt of the respective one of the plurality of key segments. A list identifying the plurality of peer client devices is finally provided to a key escrow service, the list comprising key-value pairs that identify each respective one of the plurality of peer client devices and the respective one of the plurality of key segments.

20 Claims, 4 Drawing Sheets

ZERO-KNOWLEDGE KEY ESCROW

BACKGROUND

Key escrow allows for encryption keys to be stored by a third-party in order to recover encryption keys if they are lost, destroyed, deleted, or otherwise become inaccessible or irretrievable. For example, if an employee's computer is accidentally destroyed, a copy of the employee's encryption keys could be recovered from a key escrow server in order to allow the employee to recover or otherwise access data encrypted using any encryption keys stored on the employee's computer. However, if they key escrow server is compromised or accessed by a malicious actor, the security of any encryption keys stored using the key escrow server become compromised.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing key escrow services without revealing the actual encryption keys themselves to the key escrow provider. To protect a cryptographic key from an owner or operator of a key escrow system, an encryption key is split into multiple parts. Each part is then sent to a peer device, which encrypts the respective part. The encrypted parts of the key are then stored in the key escrow system along with a record of which peer device encrypted the encrypted part. Because the key escrow system only sees encrypted portions of a cryptographic key, the owner or operator of the key escrow system is unable to discern the cryptographic key itself. Likewise, because the individual peers only encrypt or decrypt portions of the cryptographic key, no single peer is able to discern the entire cryptographic key. In the following discussion, a general description of the system and its components is provided, followed by a discussion of the operation of the same.

Figure 1:
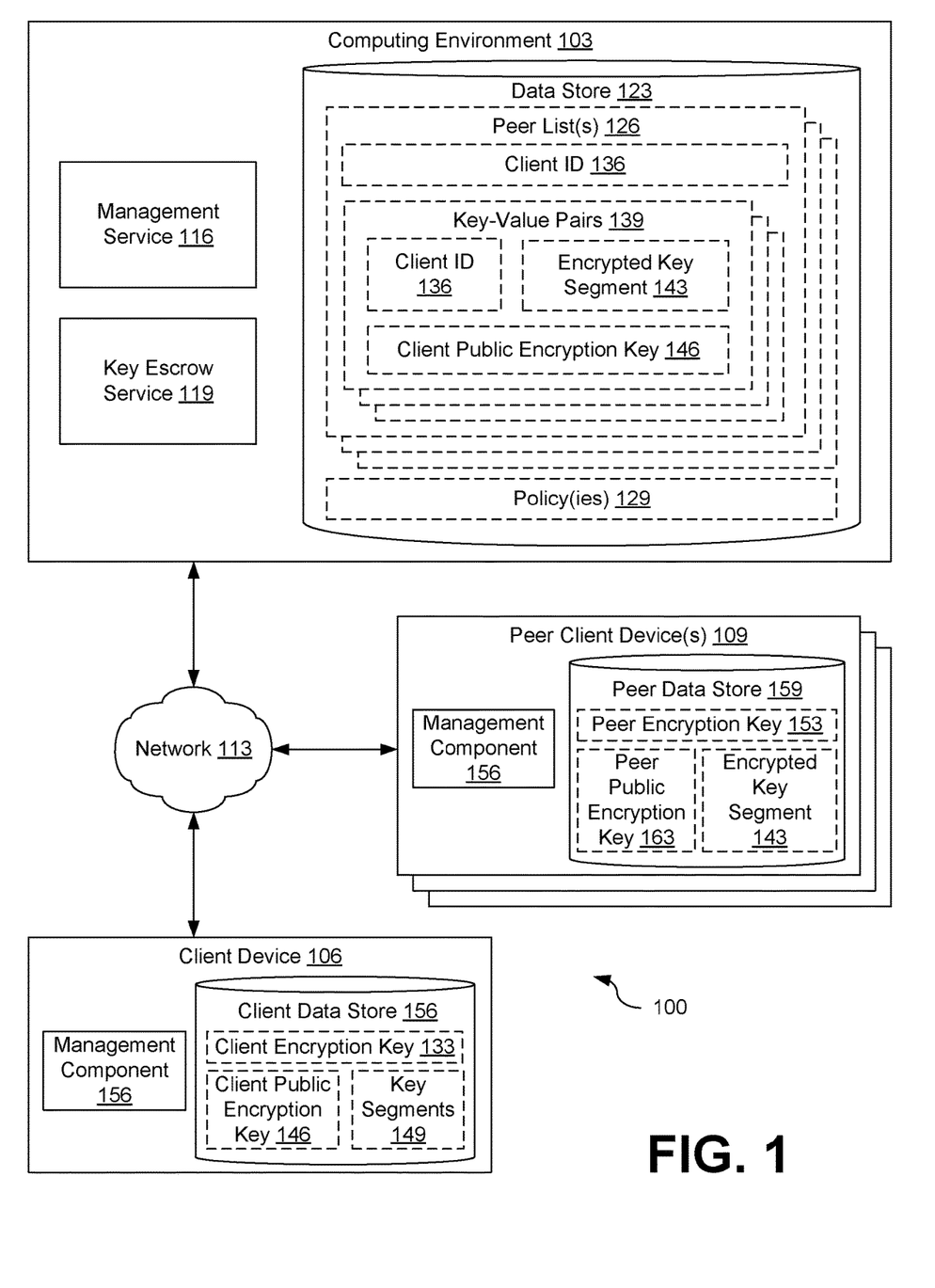
FIG. 1 is a drawing of a networked environment according to various embodiments of the present disclosure.

With reference to FIG. 1, shown is a networked environment 100 according to various embodiments. The networked environment 100 includes a computing environment 103 and one or more clients, depicted as client device 106 and peer client devices 109, which are in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103 include the management service 116 and the key escrow service 119.

Also, various data is stored in a data store 123 that is accessible to the computing environment 103. The data store 123 can be representative of a plurality of data stores 123, which can include relational databases, object-oriented databases, hierarchical databases, hash tables or similar key-value data stores, as well as other data storage applications or data structures. The data stored in the data store 123 is associated with the operation of the various applications or functional entities described below. This data can include one or more peer lists 126, one or more policies 129, and potentially other data.

The management service 116 can administer or otherwise oversee the operation of client devices 106 and peer client devices 109 enrolled with the management service 116. In some examples, an enterprise, such as a company, organization, or other entity, can operate the management service 116 to oversee or manage the operation of the client devices 106 of its employees, contractors, customers, or other users. For example, the management service 116 can identify policies 129 that are applicable to individual clients and cause the policies to be enforced on the clients, as discussed in detail later.

The key escrow service 119 can maintain peer lists 126 provided by individual client devices 106. This can include receiving and storing peer lists 126 received from client devices 106 and storing updates to the peer lists 126 received from client devices 106 or peer client devices 109. The key escrow service 119 can also provide copies of the peer lists 126 to the client device 106 or other users upon request.

The individual peer lists 126 can represent a mapping of indicating which portions of a client encryption key 133 stored on a client device 106 have been encrypted by respective peer client devices 109. Accordingly, a peer list 126 can include a client identifier 136 and one or more key-value pairs 139.

A client identifier 136 can include any identifier that uniquely identifies a client with respect to another client. Examples of client identifiers 136 can include media access control (MAC) addresses of network interfaces for client devices 106 or peer client devices 109, serial numbers of client devices 106 or peer client devices 109, international mobile equipment identifier (IMEI) numbers assigned to client devices 106 or peer client devices 109, universally unique identifiers (UUIDs) or globally unique identifiers (GUIDs) assigned to client devices 106 or peer client devices 109, etc.

A key-value pair 139 represents a record indicating which peer client device 109 created an encrypted key segment 143. Accordingly, a key-value pair 139 can include a client identifier 136 identifying the respective peer client device 109, a copy of the encrypted key segment 143, and a client public encryption key 146 of the client device 106.

The encrypted key segment 143 represents an encrypted version of a key segment 149 of the client encryption key 133 of the client device 106. As discussed later, the encrypted key segment 143 can be generated by a peer client device 109 using the peer encryption key 153 of the peer client device 109.

The client public encryption key 146 is the public key of an asymmetric encryption key-pair assigned to the client device 106. In some implementations, the client public encryption key 146 can be generated by the client device 106 and stored locally on the client device 106. In other implementations, the management service 116 can generate and/or assign the client public encryption key 146. For example, if the management service 116 were to provide a device certificate or user certificate to the client device 106, the certificate might include the client public encryption key 146.

The policy 129 can represent a compliance policy that specifies various configuration details for a client device 106 or peer client device 109. For example, a policy 129 could specify which peer client devices 109 can be used to generate an encrypted key segment 143 from a key segment 149. As another example, a policy 129 could specify a minimum number of key segments 149 that a client device 106 is to create. Additional examples of policies 129 will be discussed throughout the application where a policy 129 can impact the operation of various implementations.

The client device 106 and peer client device 109 are representative of a plurality of clients that can be coupled to the network 113. Although the client device 106 and the peer client device 109 are depicted separately for clarity, any client can act as both a client device 106 and as a peer client device 109 on behalf of other clients.

The client device 106 or the peer client device 109 can include a processor-based computer system. Examples of processor-based computer systems include personal computers (e.g., a desktop computer, a laptop computer, or similar device), a mobile computing device (e.g., personal digital assistants, cellular telephones, smartphones, web pads, tablet computer systems, and similar devices), or other devices with like capability. The client device 106 or peer client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or peer client device 109. In other instances, the display can be connected through a wired or wireless connection.

The client device 106 or peer client devices 109 can be configured to execute various applications. For example, the client device 106 or peer client devices 109 can have a management component 156 installed, which they can execute as later described. The client device 106 or peer client devices 109 can also have other applications installed, such as web browsers, email applications, content lockers, messaging applications, voice over internet protocol (VoIP) applications, social networking applications, word processors, spreadsheets, etc.

Clients, such as the client device 106 and the peer client devices 109, can also include local data stores as indicated by client data store 156 and peer data store 159. Examples of the client data store 156 and peer data store 159 can include relational databases, object-oriented databases, hierarchical databases, hash tables or similar key-value data stores, as well as other data storage applications or data structures. The client data store 156 can be used to store the client encryption key 133 for a client device 106, the client public encryption key 146 for the client device 106, and one or more key segments 149. The peer data store 159 can be used to store the peer encryption key 153 of a peer client device 109, the peer public encryption key 163 of the peer client device 109, and any encrypted key segments 143 generated using the peer encryption key 153.

Although depicted separately as a client data store 156 and a peer data store 159 for clarity, many implementations can utilize a single data store for all clients. When a client is participating in the role of a client device 106, the client can make use of its own client encryption key 133, client public encryption key 146, and key segments 149 and store them in a data store located on the client. When a client is participating in the role of a peer client device 109, the client can use its client encryption key 133 in the role of a peer encryption key 153 to generate encrypted key segments 143 for other client devices 106.

The management component 156 is executed to perform various operations on the clients. For example, the management component 156 can retrieve polices 129 from the management service 116 that govern the operation of the client device 106 or peer client devices 109. When executed on the client device 106, the management service 116 can create key segments from a client encryption key 133 of the client device 106. When executed by a peer client device 109, the management component can generate encrypted key segments 143. The management component 156 can be executed on both the client device 106 and the peer client devices 109 to provide the data used by the key escrow service 119 to create peer lists 126.

The client encryption key 133 is a client specific encryption key stored on the client device 106. The client encryption key 133 can be used by the client device 106 to encrypt data so that only the client device 106 can decrypt and access the data in the future. For example, the client encryption key 133 might be used to encrypt files before uploading them to network-based storage (e.g., a storage area network (SAN), a network attached storage (NAS) device, cloud based storage services, etc.). Similarly, the client encryption key 133 might be used to encrypt data stored locally in the client data store 156. Although any type of encryption key can be used for the client encryption key 133, symmetric encryption keys can often be used for the client encryption key 133 due to the speed and efficiency of encryption and decryption compared to asymmetric encryption algorithms. Although the client encryption key 133 is depicted as being stored in the client data store 156, some implementations can store the client encryption key 133 in a secure data enclave, such as a trusted platform module (TPM), a hardware security module (HSM), or a trusted execution environment (TEE) provided by the client device 106.

Similar to the client encryption key 133, the peer encryption key 153 is a client specific encryption key stored on a peer client device 109. When a client is acting in the role of a peer client device 109, the encryption key is referred to as a peer encryption key 153 for clarity. Likewise, when the client is acting in the role of a client device 106, the encryption key is referred to as a client encryption key 133 for clarity.

The key segments 149 are portions of the client encryption key 133 generated by the management component 156 executing on the client device 106. The key segments 149 can be generated using any number of secret sharing or secret splitting techniques. Examples of secret sharing techniques include Shamir's secret sharing algorithm, Blakely's secret sharing algorithm, and various secret sharing algorithms based on the Chinese remainder theorem. For each key segment 149 created by the management component 156, a respective encrypted key segment 143 can be created by a peer client device 109 for storage in the data store 123 of the computing environment 103, as described in further detail later.

The client public encryption key 146 is the public encryption key of an asymmetric key pair created for the client device 106. Examples of asymmetric key pairs include Rivest-Shamir-Adleman (RSA) key pairs and elliptic curve cryptography (ECC) key pairs. The client public encryption 146 can be used for a variety of purposes including authenticating individual key segments 149 sent from the client device 106 to a peer client device 109 and for encrypting key segments 149 sent from a peer client device 109 to the client device 106.

Similarly, the peer public encryption key 163 is a client specific public encryption key of an asymmetric key pair created for a peer client device 109. When a client is acting in the role of a peer client device 109, the public key is referred to as a peer public encryption key 163 for clarity. Likewise, when the client is acting in the role of a client device 106, the public key is referred to as a client public encryption key 146 for clarity.

Next, a general description of the operation of the various components of the networked environment 100 is provided. While the following description provides an example of the interaction of the various components of the network environment 100, more detailed descriptions of the operation of individual components is provided in the discussion of FIGS. 2-4.

To begin, the management component 156 executing on the client device 106 splits the client encryption key 133 into multiple key segments 149. This can be done, for example, in response to a command to store the client encryption key 133 with the key escrow service 119 or in order to comply with a policy 129 retrieved from the management service 116. An example of a policy 129 could be a policy 129 that requires a registered or enrolled device to use the key escrow service 119 for safe-guarding the client encryption key 133 of the client device 106.

The management component 156 on the client device 106 then selects a number of peer client devices 109 for receiving a respective key segment 149. The peer client devices 109 can be selected according to various criteria. For example, a policy 129 can specify that only fully patched peer client devices 109 can be selected, that peer client devices 109 on the same LAN can be selected, that peer client devices 109 in wireless data communication (e.g., BLUETOOTH® or near-field communication (NFC)) can be selected, or that only peer client devices 109 associated with the same user can be selected (e.g., a user's laptop, tablet, etc.).

Subsequently, the management component 156 executing on the client device 106 sends a key segment 149 to each peer client device 109. The key segment 149 can be accompanied by a copy of the client public encryption key 146 to allow for a peer client device 109 to verify the key segment 149 received (e.g., a digital signature generated by the client device 106 using a corresponding private key). To prevent interception of the key segments 149, each key segment can be encrypted using the peer public encryption key 163 of the peer client device 109 to which the key segment 149 is sent.

The management component 156 on each peer client device 109 then generates an encrypted key segment 143 for the respective key segment 149 that the peer client device 109 receives. For example, the peer client device 109 can use its peer encryption key 153 to encrypt the key segment it received to generate the encrypted key segment 143. After receiving the key segment 149 and creating the encrypted key segment 143, each peer client device 109 can then send an acknowledgment to the client device 106 indicating that the peer client device 109 successfully created an encrypted key segment 143.

After receiving an acknowledgment from each peer client device 109, the client device 106 can then send to the key escrow service 119 a list of the peer client devices 109 that created the encrypted key segments 143. Meanwhile, each peer client device 109 can send a copy of the encrypted key segment 143 it created to the key escrow service 119. The key escrow service 119 can then create and store a peer list 126 in the data store 126 that is associated with the client device 106 and contains key-value pairs 139 that store the encrypted key segments 143 and identify which peer client device 109 created each encrypted key segment 143.

If the client encryption key 133 needs to be recreated at a later date, the key escrow service 119 can then be queried to identify the peer client devices 109 that created the encrypted key segments 143. For example, if a client device 106 is wiped, lost, or the client encryption key 133 otherwise becomes irretrievable or inaccessible, one could retrieve from the key escrow service 119 the client identifier 136 of each peer client device 109 used to create an encrypted key segment 143 and the encrypted key segment 143 created by the peer client device 109. Requests could then be sent to each peer client device 109 or a subset of peer client devices 109, depending on the particular secret sharing technique used, to have the management component 156 installed on the peer client devices 109 decrypt the encrypted key segments 143 to reveal the respective key segments 149. Once a sufficient number of encrypted key segments 143 had been decrypted into the respective key segments 149, the client encryption key 133 could be recreated using the appropriate secret sharing technique.

As a result, key escrow services can be provided to the client device 106 without any other single party having knowledge of the client encryption key 133 itself. Each peer client device 109 only has access to a portion of the client encryption key 133, in the form of the key segment 149, and is therefore unable to recreate the client encryption key 133. Similarly, the key escrow service 119

Figure 2:
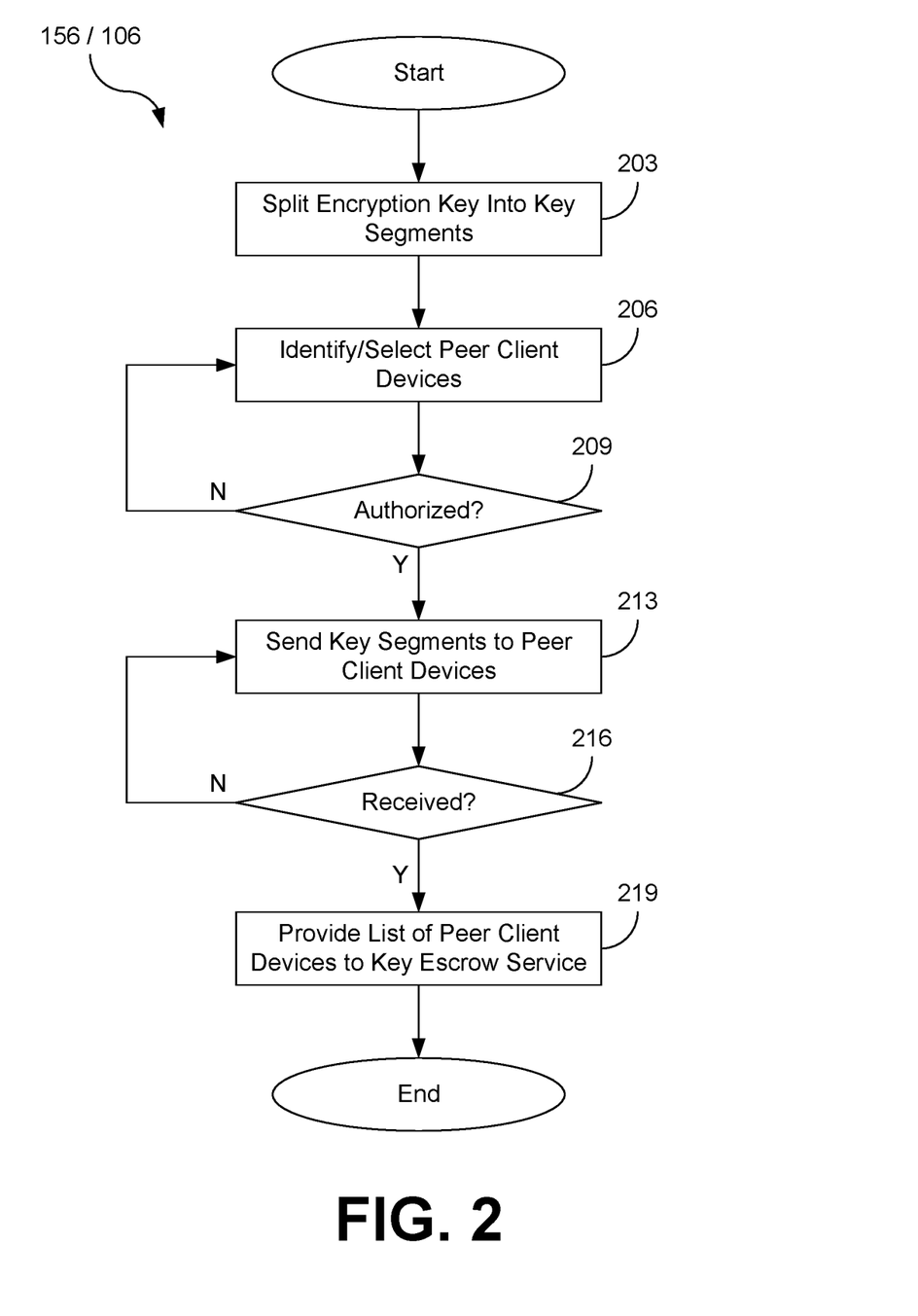
FIG. 2 is a flowchart illustrating examples of functionality implemented in the networked environment of FIG. 1 according to various embodiments of the present disclosure.

Referring next to FIG. 2, shown is a flowchart that provides one example of the operation of a portion of the management component 156 executed by a client device 106. It is understood that the flowchart of FIG. 2 provides merely an example of the many different types of functional arrangements that can be employed to implement the operation of the management component 156 in the client device 106. As an alternative, the flowchart of FIG. 2 can be viewed as depicting an example of elements of a method implemented in the client device 106 according to one or more embodiments.

Beginning with step 203, the management component executing 153 executing on the client device 109 splits the client encryption key 133 into multiple key segments 149. The number of key segments 149 can be specified by a policy 129 (e.g., a compliance policy 129 specifying a minimum number of key segments to be used for security purposes). The manner in which the key segments 149 are created from the client encryption key 133 can also vary depending on the type of secret sharing technique used.

Then, at step 206, the management component executing 153 executing on the client device 106 identifies one or more peer client devices 109 to encrypt the key segments 149. To identify potential peer client devices 109, the management component 156 executing on the client device 106 can send a broadcast request across the network and wait to receive responses from any peer client devices 109. Each response from a peer client device 109 can include information about the peer client device 109 that can be used to evaluate the suitability or eligibility of the peer client device 109. In the alternative, the management component 156 executing on the client device 106 could send a request to the management service 116 for a list of potential peer client devices 109 and receive a list in response.

Next at step 209, the management component executing 153 executing on the client device 106 can determine whether or not the identified potential peer client devices 109 are authorized to act as peer client devices 109 for key escrow purposes. If a peer client device 109 is determined to be unauthorized or ineligible, then the process returns to step 206 and additional potential peer client devices 109 can be identified and selected. However, if all of the potential peer client devices 109 identified at step 206 are authorized to as peer client devices 109, then the process proceeds to step 213.

Whether a potential peer client device 109 is authorized to act as a peer client device 109 can be determined using a number of approaches. For instance, a potential peer client device 109 can be considered to be authorized to act as a peer client device 109 if it complies with one or more applicable polices 129. For example, a policy 129 can specify that a peer client device 109 is authorized if it is located on the same LAN as the client device 106. As another example, a policy 129 can specify that only certain devices are authorized to act as peer client devices 109, such as devices that are fully patched, devices that are registered or enrolled to a specific owner or class of owners, or that a peer client device 109 is unauthorized if another peer client device 109 be associated with or linked to the same individual has already been selected. As another example, the management component 156 executing on the client device 106 can create a prompt that is rendered in a user interface on the display of the client device 106. The prompt can ask a user to confirm that each peer client device 109 is authorized. The user can then manipulate a user interface element to confirm whether or not a potential peer client device 109 is authorized to act as a peer client device 109.

Proceeding to step 213, the management component executing 153 executing on the client device 106 sends a respective key segment 149 to each selected peer client device 109. As part of the transmission process, the management component 156 executing on the client device 106 can encrypt the key segment 149 using the peer public encryption key 163 in order to prevent interception of the key segment 149 by unauthorized parties, which can be retrieved from the peer client device 109 directly or from a key distribution server or service. The management component 156 executing on the client device 106 can also sign the key segment 149 with the client public encryption key 146 and send a copy of the client public encryption key 146 to the peer client device 109 to permit the peer client device to authenticate the key segment 149.

Then, at step 216, the management component executing 153 executing on the client device 106 receives an acknowledgement from each peer client device 106 that an encrypted key segment 143 has been created from the respective key segment 149 sent to each peer client device 109. If an acknowledgement is not received (e.g., due to the expiration of a time-out), then process can return to step 213 and the management component 156 executing on the client device 106 can send the key segment 149 a subsequent time. However, in some implementations, the process can instead return to step 206 so that a new peer client device 109 can be selected.

Next, at step 219, the management component 156 executing on the client device 106 sends a list of the peer client devices 109 that provided an acknowledgement or reply at step 219 to the key escrow service 119, which the key escrow service 119 can use to create a peer list 126. For example, the management component 156 executing on the client device 106 can provide a client identifier 136 for the client device 106 and a series of client identifiers 136 that identify the peer client devices 109 to the key escrow service 119.

Figure 3:
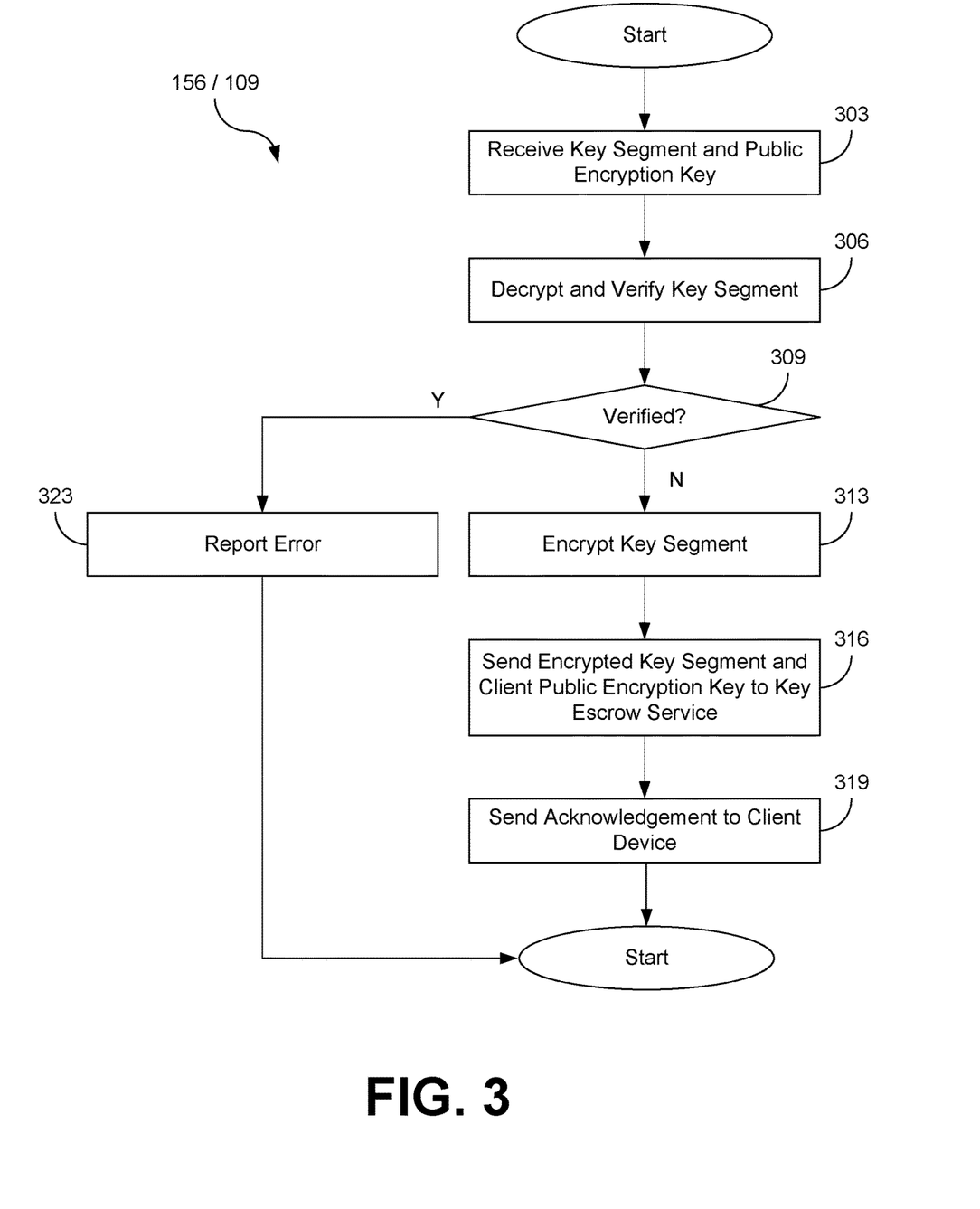
FIG. 3 is a flowchart illustrating examples of functionality implemented in the networked environment of FIG. 1 according to various embodiments of the present disclosure.

Referring next to FIG. 3, shown is a flowchart that provides one example of the operation of a portion of the management component 156 executing on a peer client device 109. It is understood that the flowchart of FIG. 2 provides merely an example of the many different types of functional arrangements that can be employed to implement the operation of the management component 156 executing on the peer client device 109. As an alternative, the flowchart of FIG. 3 can be viewed as depicting an example of elements of a method implemented by a peer client device 109.

Beginning with step 303, the management component 156 executing on the peer client device 109 receives a key segment 149 from a client device 106. In some implementations, the management component 156 executing on the peer client device 109 can also receive the client public encryption key 146. In other implementations, however, the management component 156 can instead retrieve the client public encryption key 146 from a key distribution server or similar service.

Then at step 306, the management component 156 executing on the peer client device 109 can decrypt and verify the key segment 149 to ensure that the key segment 149 is authentic and has not been tampered with. For example, the management component 156 executing on the peer client device 109 can use a corresponding private key of the peer public encryption key 163 to decrypt the key segment 149. The management component 156 can also use the client public encryption key 146 to verify a cryptographic signature of the key segment 149 to ensure it has not been altered during transmission.

Next at step 309, the management component 156 executing on the peer client device 109 determines whether the key segment 149 has been verified. For example, if the cryptographic signature that accompanies the key segment 149 matches the cryptographic signature calculated by the management component 156 executing on the peer client device 109, then the management component 156 executing on the peer client device 109 can determine that the key segment 149 is authentic. If there is no match, then the management component 156 executing on the peer client device 109 can determine that the key segment 149 has been altered during transmission. If verification is successful, then the process can proceed to step 313. However, if verification is unsuccessful, then the process can proceed to step 323.

Then at step 313, the management component 156 executing on the peer client device 109 can encrypt the key segment 149. To encrypt the key segment 149, the management component 156 executing on the peer client device 109 can use the peer client device 109 specific peer encryption key 153. As a result, the management component 156 executing on the peer client device 109 can generate a respective encrypted key segment 143 for the key segment 149 it received.

Proceeding to step 316, the management component 156 executing on the peer client device 109 sends the encrypted key segment 143 to the key escrow service 119 for future storage. The management component 156 executing on the peer client device 109 can also provide a client identifier 136 that uniquely identifies the peer client device 109, thereby enabling the key escrow service 119 to track which peer client device 109 created that encrypted key segment 143 so that the appropriate peer client device 109 can be requested to decrypted the encrypted key segment 143 in the future, if desired. A copy of the client public encryption key 146 can also be provided to the key escrow service so that the peer client devices 109 can securely send a decrypted version of the encrypted key segment 143 to the client device 106 in the future. In some implementations, once the encrypted key segment 143 has been sent to the key escrow service 119, all copies of the encrypted key segment 143 and the key segment 149 can be deleted from the memory of the peer client device 109 to enhance the long term security of the system.

Finally, at step 319, the management component 156 executing on the peer client device 109 can send an acknowledgement to the client device 106. The acknowledgement can indicate that the encrypted key segment 143 was successfully created. The acknowledgement can also indicate that the encrypted key segment 143 was successfully uploaded to the key escrow service 119. The process can then end.

However, if execution proceeds instead to step 323, the management component 156 executing on the peer client device 109 can report an error indicating that the key segment 149 received from the client device 106. For example, the management component 156 executing on the peer client device 109 can send a response to the client device 106 indicating that the cryptographic signature of the key segment 149 was invalid, indicating that the key segment 149 was altered during transit. After reporting the error, the process can then end.

Figure 4:
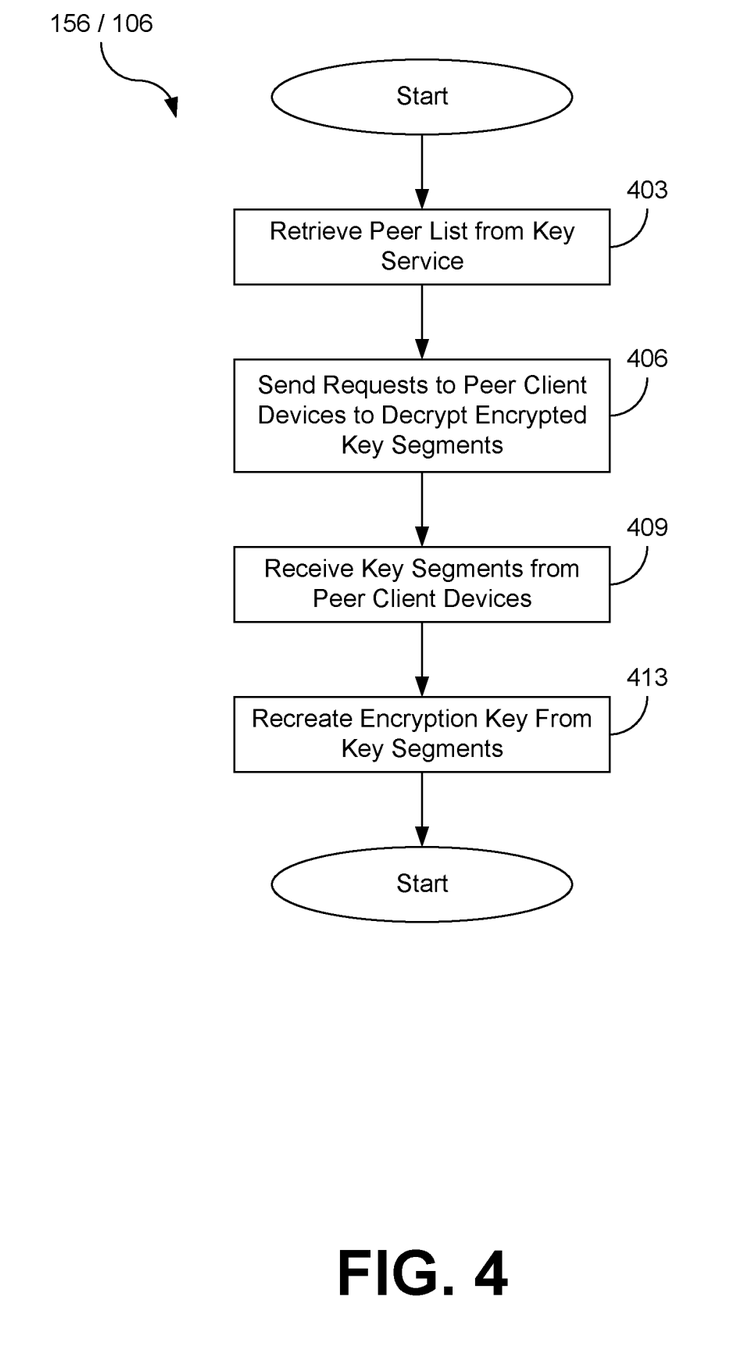
FIG. 4 is a flowchart illustrating examples of functionality implemented in the networked environment of FIG. 1 according to various embodiments of the present disclosure.

Referring next to FIG. 4, shown is a flowchart that provides one example of the operation of a portion of the management component 156 executed by a client device 106. It is understood that the flowchart of FIG. 4 provides merely an example of the many different types of functional arrangements that can be employed to implement the operation of the management component 156 in the client device 106. As an alternative, the flowchart of FIG. 4 can be viewed as depicting an example of elements of a method implemented in the client device 106 according to one or more embodiments.

Beginning with step 403, the management component 156 executing on the client device 106 can begin the key reconstruction process by sending a request to the key escrow service 119 for a copy of the peer list 126 associated with the client device 106. For example, the management component 156 executing on the client device 106 can send the client identifier 136 of the client device 106 to the key escrow service 119 and receive a peer list 126 identified by the client identifier 136 of the client device 106 in response.

Next at step 406, the management component 156 executing on the client device 106 can send requests to the peer client devices 109 identified in the peer list 126 to decrypt respective encrypted key segments 143. The requests can include copies of the encrypted key segments 143 to be decrypted.

Then at step 409, the management component 156 executing on the client device 106 receives a decrypted key segment 149 from one or more peer client devices 109.

Finally, at step 413, the management component 156 executing on the client device 106 recreates the client encryption key 133 from the key segments 149 received at step 409. In some implementations, the management component 156 executing on the client device 106 waits until all of the key segments 149 have been received. In other implementations, the management component 156 executing on the client device 106 can recreate the client encryption key 133 once a threshold number of key segments 149 have been received. Whichever implementation is utilized depends on the type of secret sharing technique is used.

Although the management service 116, the key escrow service 119, and the management component 156 can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although the flowcharts of FIGS. 2-4 show a specific order of execution, it is understood that the order of execution can differ from that which is depicted. For example, the order of execution of two or more blocks can be scrambled relative to the order shown. Also, two or more blocks shown in succession in FIGS. 2-4 can be executed concurrently or with partial concurrence. Further, in some embodiments, one or more of the blocks shown in FIGS. 2-4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the management service 116, the key escrow service 119, and the management component 156, that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management service 116, the key escrow service 119, and the management component 156, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a client device comprising a processor and a memory; and
   machine readable instructions stored in the memory that, when executed by the processor, cause the client device to at least:
   split an encryption key stored in the memory into a plurality of key segments pursuant to a shared secret protocol;
   identify a plurality of peer client devices by causing the client device to at least:
   scan a network for potential peer client devices that comply with at least one policy; and
   randomly select a subset of the potential peer client devices for inclusion in the plurality of peer client devices;
   verify that each peer client device in the plurality of peer client devices is authorized to receive a respective one of the plurality of key segments;
   send the respective one of the plurality of key segments to a respective one of the plurality of peer client devices;
   receive a response from each respective one of the plurality of peer client devices, the response confirming receipt of the respective one of the plurality of key segments;
   and
   provide a list identifying the plurality of peer client devices to a key escrow service, the list comprising key-value pairs that identify each respective one of the plurality of peer client devices and the respective one of the plurality of key segments.

2. The system of claim 1, wherein the machine readable instructions, when executed by the processor, further cause the client device to at least send a public encryption key stored on the client device to each respective one of the plurality of peer client devices.

3. The system of claim 1, wherein the machine readable instructions that cause the client device to verify that each peer client device in the plurality of peer client devices is authorized to receive the respective one of the plurality of key segments further cause the client device to at least:
   render a prompt in a user interface of the client device for each peer client device, the prompt requesting the user to verify each peer client device.

4. The system of claim 3, wherein the machine readable instructions that cause the client device to verify that each peer client device in the plurality of peer client devices is authorized to receive the respective one of the plurality of key segments further cause the client device to at least verify each peer client device based on a manipulation of a user interface element in the prompt.

5. The system of claim 1, wherein the machine readable instructions that cause the client device to verify that each peer client device in the plurality of peer client devices is authorized to receive the respective one of the plurality of key segments further cause the client device to at least:
   determine that each peer client device complies with at least one policy.

6. The system of claim 1, wherein the machine readable instructions, when executed by the processor, further cause the client device to at least encrypt the respective one of the plurality of key segments with a public encryption key of the respective one of the plurality of peer client devices prior to sending the respective one of the plurality of key segments.

7. The system of claim 1, wherein the shared secret protocol allows for the encryption key to be reconstructed from a subset of the plurality of key segments.

8. A method, comprising:
   splitting an encryption key into a plurality of key segments pursuant to a shared secret protocol;
   identifying a plurality of peer client devices by;
   scanning a network for potential peer client devices that comply with at least one policy; and
   randomly selecting a subset of the potential peer client devices for inclusion in the plurality of peer client devices;

verifying that each peer client device in the plurality of peer client devices is authorized to receive a respective one of the plurality of key segments;

sending the respective one of the plurality of key segments to a respective one of the plurality of peer client devices;

receiving a response from each respective one of the plurality of peer client devices, the response confirming receipt of the respective one of the plurality of key segments; and providing a list identifying the plurality of peer client devices to a key escrow service, the list comprising key-value pairs that identify each respective one of the plurality of peer client devices and the respective one of the plurality of key segments.

9. The method of claim 8, further comprising sending a public encryption key to each respective one of the plurality of peer client devices.

10. The method of claim 8, wherein verifying that each peer client device in the plurality of peer client devices is authorized to receive the respective one of the plurality of key segments further comprises:

rendering a prompt in a user interface for each peer client device, the prompt requesting the user to verify each peer client device.

11. The method of claim 10, wherein verifying that each peer client device in the plurality of peer client devices is authorized to receive the respective one of the plurality of key segments further comprises verifying each peer client device based on a manipulation of a user interface element in the prompt.

12. The method of claim 8, wherein verifying that each peer client device in the plurality of peer client devices is authorized to receive the respective one of the plurality of key segments further comprises:

determine that each peer client device complies with at least one policy.

13. The method of claim 8, further comprising encrypting the respective one of the plurality of key segments with a public encryption key of the respective one of the plurality of peer client devices prior to sending the respective one of the plurality of key segments.

14. The method of claim 8, wherein the shared secret protocol allows for the encryption key to be reconstructed from a subset of the plurality of key segments.

15. A non-transitory, computer-readable medium comprising machine-readable instructions that, when executed by a processor of a client device, cause the client device to at least:

split an encryption key stored in a memory of the client device into a plurality of key segments pursuant to a shared secret protocol;

identify a plurality of peer client devices by causing the client device to at least:

scan a network for potential peer client devices that comply with at least one policy; and randomly select a subset of the potential peer client devices for inclusion in the plurality of peer client devices;

verify that each peer client device in the plurality of peer client devices is authorized to receive a respective one of the plurality of key segments;

send the respective one of the plurality of key segments to a respective one of the plurality of peer client devices;

receive a response from each respective one of the plurality of peer client devices, the response confirming receipt of the respective one of the plurality of key segments; and provide a list identifying the plurality of peer client devices to a key escrow service, the list comprising key-value pairs that identify each respective one of the plurality of peer client devices and the respective one of the plurality of key segments.

16. The non-transitory, computer-readable medium of claim 15, wherein the machine readable instructions, when executed by the processor, further cause the client device to at least:

send a public encryption key stored on the client device to each respective one of the plurality of peer client devices.

17. The non-transitory, computer-readable medium of claim 15, wherein the machine readable instructions that cause the client device to verify that each peer client device in the plurality of peer client devices is authorized to receive the respective one of the plurality of key segments further cause the client device to at least:

determine that each peer client device complies with at least one policy.

18. The non-transitory, computer-readable medium of claim 15, wherein the machine readable instructions that cause the client device to verify that each peer client device in the plurality of peer client devices is authorized to receive the respective one of the plurality of key segments further cause the client device to at least:

render a prompt in a user interface of the client device for each peer client device, the prompt requesting the user to verify each peer client device.

19. The non-transitory, computer-readable medium of claim 18, wherein the machine readable instructions that cause the client device to verify that each peer client device in the plurality of peer client devices is authorized to receive the respective one of the plurality of key segments further cause the client device to at least verify each peer client device based on a manipulation of a user interface element in the prompt.

20. The non-transitory, computer-readable medium of claim 15, wherein the machine readable instructions, when executed by the processor, further cause the client device to at least encrypt the respective one of the plurality of key segments with a public encryption key of the respective one of the plurality of peer client devices prior to sending the respective one of the plurality of key segments.

* * * * *